R. M. CARTER.
TURNING AND STOPPING SIGNAL.
APPLICATION FILED AUG. 16, 1917.
1,259,722.
Patented Mar. 19, 1918.
2 SHEETS—SHEET 1.
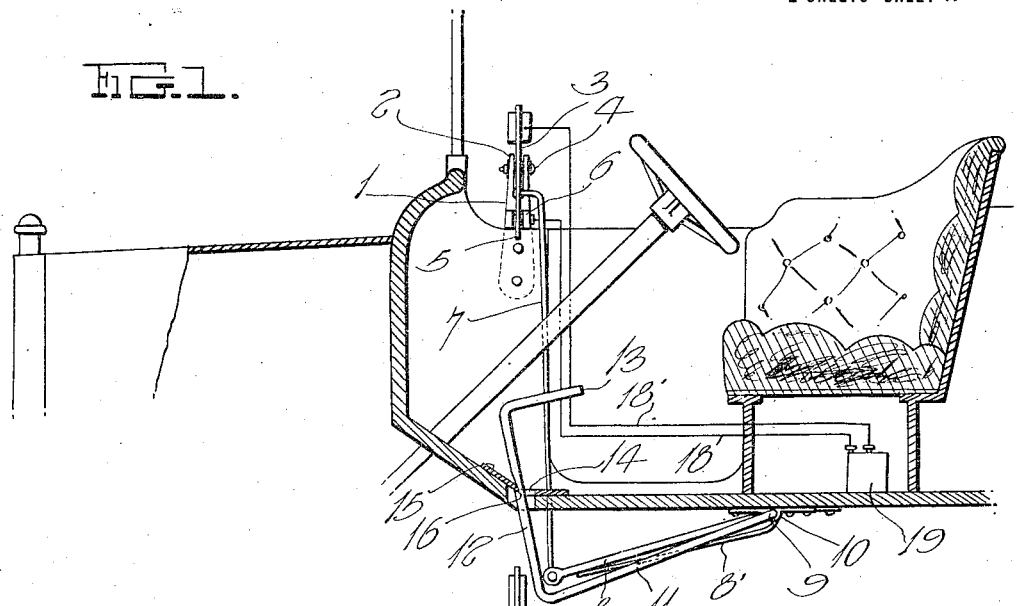
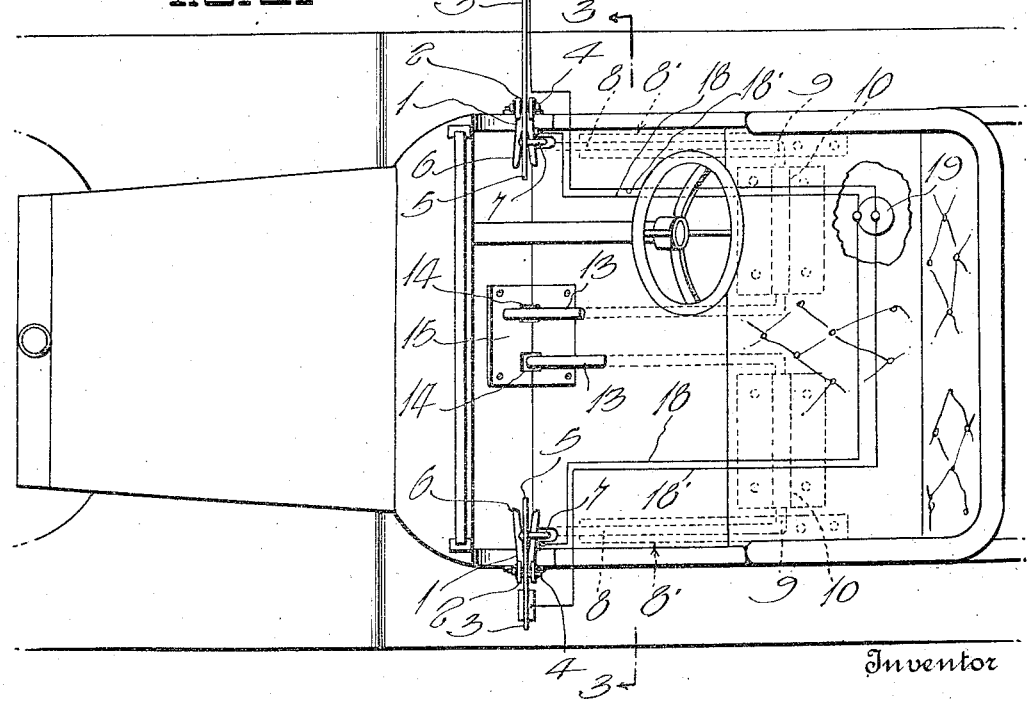
Witness
H. Woodard
Inventor
R. M. Carter
By H. A. Wilson & Co.
Attorneys

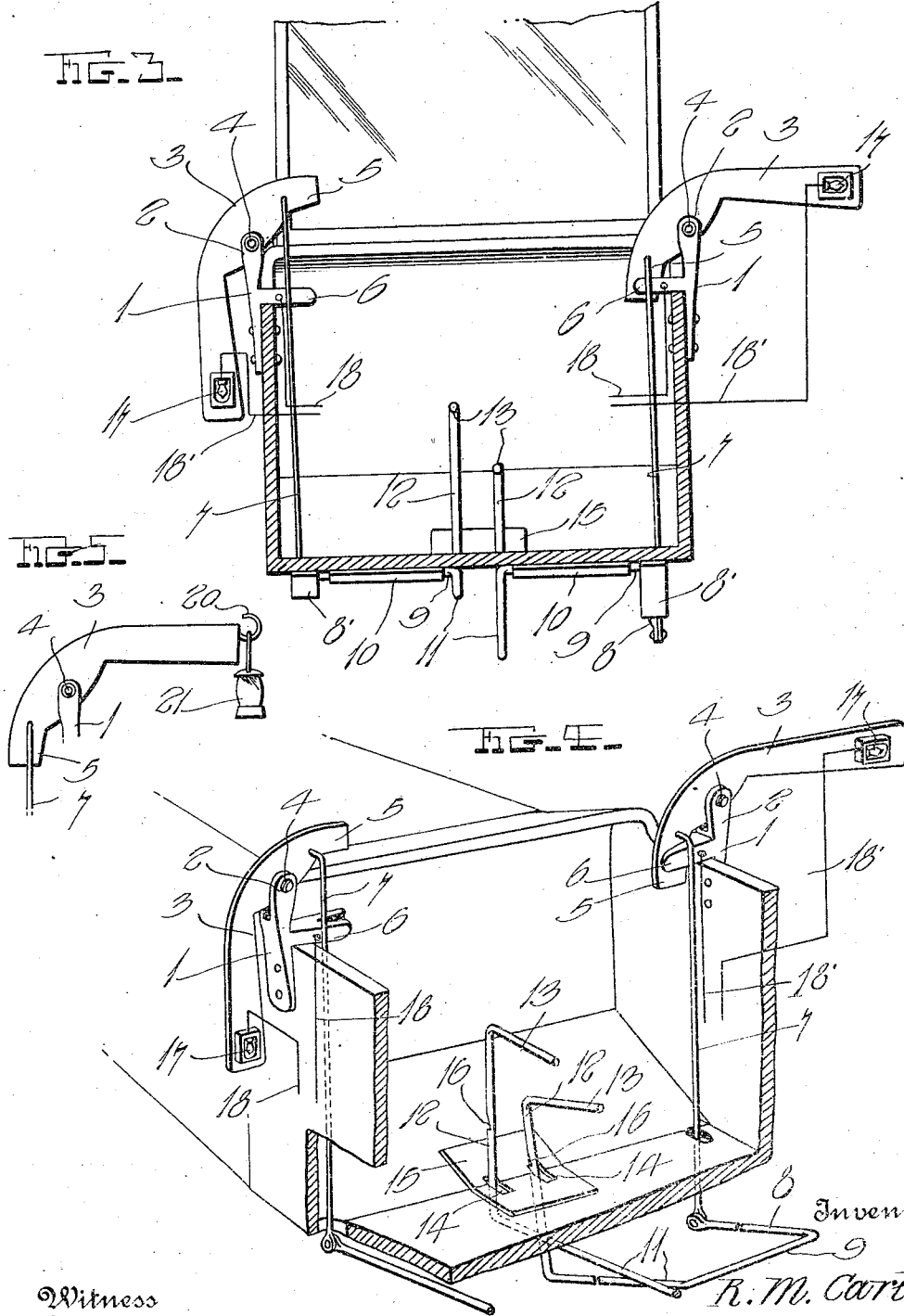

UNITED STATES PATENT OFFICE.

RICHARD M. CARTER, OF OAKLAND, CALIFORNIA.

TURNING AND STOPPING SIGNAL.

1,259,722.　　　　　Specification of Letters Patent.　　Patented Mar. 19, 1918.

Application filed August 16, 1917. Serial No. 186,597.

*To all whom it may concern:*

Be it known that I, RICHARD M. CARTER, a citizen of the United States, residing at Oakland, in the county of Alameda and State of California, have invented certain new and useful Improvements in Turning and Stopping Signals; and I do declare the following to be a full, clear, and exact description of the invention, such as will enable others skilled in the art to which it appertains to make and use the same.

My invention has for its object to provide a simply constructed and inexpensive signal for use on automobiles to notify pedestrians and the operators of other vehicles when a turn is to be made in either direction or when the vehicle is to be stopped.

With the foregoing general object in view, the invention resides in the novel features of construction to be hereinafter fully described and claimed, the descriptive matter being supplemented by the accompanying drawings which constitute a part of this application and in which:

Figure 1 is a longitudinal section of a portion of an automobile showing the application of the invention;

Fig. 2 is a top plan view of Fig. 1, showing one of the signal arms swung outwardly;

Fig. 3 is a vertical transverse section on the plane of the line 3—3 of Fig. 2;

Fig. 4 is a sectional perspective view showing one of the arms raised and the other lowered;

Fig. 5 is a side elevation showing a differently constructed arm for use primarily on trucks.

In the drawings above briefly described, the numerals 1 designate a pair of brackets to be secured to the sides of an automobile by any preferred means, said brackets having ears 2 between which signal arms 3 are pivotally mounted at 4, said arms being by preference stamped from single sheet metal plates. The inner ends 5 of the arms 3 are shaped to wedge between inwardly diverging fingers 6 which are carried by and preferably formed as integral parts of the brackets 1, this arrangement serving to make and break an electric circuit as will be described, and also acting to brace the arms against canting when thrown outwardly.

Vertical links 7 are pivoted to the inner ends of the arms 3 and extend therefrom through openings in the floor of the machine, the lower ends of said links being pivotally connected to horizontal crank arms 8 which project forwardly from transverse rock shafts 9 mounted in suitable bearings 10 beneath the floor, said shafts having other forwardly extending crank arms 11 whose front ends are directed upwardly at 12 and then rearwardly at 13 to form controls which may be operated either by the hands or feet of the person driving the car. The portions 12 of the arms 11 rise through openings 14 in a plate 15 secured to the bottom of the machine and are formed with notches 16 adapted to engage the walls of said openings when depressed as shown in Fig. 4. Springs 8' are secured to the bottom of the vehicle and bear against the lower sides of the arms 8 to return said arms to their initial positions when the notches 16 disengage from the walls of the openings 14. By the construction described, depression of either of the controls 13 will, through the instrumentality of the arm 11 actuated thereby, rock one of the shafts 9 so that the latter so actuates its respective arm 8 as to pull downwardly on the link 7 connected thereto. Such movement of the link pulls downwardly upon the inner end of the arm 3 with which it coacts and thus throws said arm outwardly to indicate that the machine will turn in that direction. When either arm is swung outwardly as described, the inner end 5 thereof is frictionally held between the fingers 6 so that even though a strong wind be blowing, the arm will not be canted upon its pivot 4.

I intend in most cases to mount a suitable electric signal lamp 17 on each of the arms 3 and to provide wiring whereby the lamp is illuminated automatically when the arm is swung outwardly. This wiring may be done in numerous ways but for illustrative purposes, I have shown current conducting wires 18 leading from a battery 19 and grounded on the brackets 1, the arms 3 being insulated from said brackets. Other wires 18' lead from the lights 17 to the battery 19. By this arrangement, when the end 5 of either arm is engaged with the fingers 6 of its respective bracket 1, the current will flow through wire 18, bracket 1 and arm 3 to the light 17 and will return from the latter to the battery by way of the wire 18', thus illuminating the lamp. The moment the arm is lowered, however, the circuit will be broken.

On some types of machines such as trucks, it may not be desirable to use electric lights on the arms 3 and in order to adapt the device for use on such machines, when running at night, I may provide the construction illustrated in Fig. 5. In this figure, a hook 20 is shown on the outer end of arm 3 so that a lantern 21 may be suspended from said hook.

From the foregoing, taken in connection with the accompanying drawings, the construction and manner of operation of the invention will be understood, but I wish to further state that each rock shaft 9 and the parts 8, 11, 12 and 13 coacting therewith, will by preference be bent from a single rod as illustrated in the drawings, this construction being extremely simple and inexpensive, yet highly efficient, the vertical portions 12 of the arms 11 being permitted to spring the necessary amount for engaging and disengaging the notches 16 with and from the walls of the openings 14.

Since probably the best results are obtained by the several specific details shown and described, such details constitute the preferred form of the device, but I wish it understood that within the scope of the invention as claimed, numerous minor changes may be made without sacrificing the principal advantages.

I claim:

1. In a turning signal for vehicles, the combination of a signal for projection beyond the side thereof, a vertical link for projecting and retracting said signal, a rock shaft below the floor of the vehicle and having one end bent laterally to form a crank arm pivoted to the lower end of said link, the other end of said shaft being bent laterally in the same direction to form an additional crank arm whose free end is bent upwardly to provide a control for said second arm.

2. In a turning signal for vehicles, the combination of a signal for projection beyond the side thereof, a vertical link for projecting and retracting said signal, a rock shaft below the floor of the vehicle and having one end bent laterally to form a crank arm pivoted to the lower end of said link, the other end of said shaft being bent laterally in the same direction to form an additional crank arm whose free end is bent upwardly and then horizontally to provide a control for said second arm, the upwardly bent portion of said second arm having a notch, and a fixed plate through which said portion rises, said notch engaging said plate to hold said second arm depressed.

3. In a turning signal for vehicles, the combination of a bracket secured to the vehicle and having a pair of laterally extending fingers, a signal arm pivoted to said bracket and having a portion adapted to wedge between said fingers when said arm is thrown outwardly, and means for operating said arm.

4. In a turning signal for vehicles, the combination of a vertical arm secured to the vehicle body and having a bifurcated upper end, a lug extending inwardly from said arm and bifurcated at its inner end to provide a pair of horizontally spaced fingers, an angular signal arm pivoted between its ends in the bifurcated upper end of said first named arm, and means for swinging said signal arm outwardly, the inner end of said signal arm being receivable between said fingers when the outer end of this arm is projected.

In testimony whereof I have hereunto set my hand in the presence of two subscribing witnesses.

RICHARD M. CARTER.

Witnesses:
P. V. Thomas,
L. A. Brown.